United States Patent [19]
Hörold et al.

[11] Patent Number: 6,156,825
[45] Date of Patent: Dec. 5, 2000

[54] FLAME-RETARDANT, UNSATURATED POLYESTER RESINS

[75] Inventors: Sebastian Hörold, Erftstadt; Guido Arnsmann, Hürth, both of Germany

[73] Assignee: Clariant GmbH, Frankfurt, Germany

[21] Appl. No.: 09/408,641

[22] Filed: Sep. 30, 1999

Related U.S. Application Data

[63] Continuation of application No. 08/986,676, Dec. 8, 1997, abandoned.

[30] Foreign Application Priority Data

Dec. 11, 1996 [DE] Germany .......................... 196 51 471

[51] Int. Cl.⁷ .................................................. C08K 67/00
[52] U.S. Cl. ........................... 523/506; 523/508; 524/80; 524/100; 524/101
[58] Field of Search ................................... 523/506, 508; 524/80, 100, 101

[56] References Cited

U.S. PATENT DOCUMENTS

| | | |
|---|---|---|
| 4,698,215 | 10/1987 | Albanesi et al. . |
| 4,853,424 | 8/1989 | Staendeke et al. . |
| 4,957,950 | 9/1990 | Staendeke et al. . |
| 5,041,490 | 8/1991 | Sakon et al. . |
| 5,543,444 | 8/1996 | Kobayashi et al. . |

FOREIGN PATENT DOCUMENTS

| | | |
|---|---|---|
| 2159757 | 11/1981 | Germany . |
| 3728629 | 11/1981 | Germany . |
| 55-94918 | 7/1980 | Japan . |
| 57-16017 | 1/1982 | Japan . |
| 5-245838 | 9/1993 | Japan . |
| 159350 | 12/1992 | Poland . |
| 161333 | 6/1993 | Poland . |
| 1414998 | 11/1975 | United Kingdom . |
| 2250291 | 6/1992 | United Kingdom . |

OTHER PUBLICATIONS

G. Stauffer et al: Kunstoffe 85 (1995) 4, pp. 533–538.
Derwent abstract XP–002059568.
Derwent abstract XP–002059569.

*Primary Examiner*—Veronica P. Hoke
*Attorney, Agent, or Firm*—Miles B. Dearth; Scott E. Hanf

[57] ABSTRACT

The invention relates to halogen-free and flame-retardant unsaturated polyester resins which contain, as flame retardants, a combination of aluminum hydroxide, at least one nitrogen component and red phosphorus, to a process for their preparation and to their use.

8 Claims, No Drawings

FLAME-RETARDANT, UNSATURATED POLYESTER RESINS

This is a continuation of application Ser. No. 08/986,676 filed Dec. 8, 1997, now abandoned.

The invention relates to halogen-free and flame-retardant unsaturated polyester resins, to a process for their preparation, and to their use.

Components made from glass-fiber-reinforced unsaturated polyester resins are distinguished by their good mechanical properties, low density, extensive resistance to chemicals and excellent surface quality. These properties, together with their favorable price, have caused these components increasingly to take over the role of metallic materials in the application sectors of rail vehicles, building and aeronautics.

Depending on the respective area of application, the unsaturated polyester resins are subject to different requirements with respect to mechanical, electrical and fire-protection properties. Thus, in recent times, the fire protection requirements particularly in the rail vehicles sector have been made considerably more stringent.

It is known that unsaturated polyester resins may be made flame-retardant by using bromine- or chlorine-containing acids or alcohol components, for example hexachloroendomethylenetetrahydrophthalic acid (HET acid), tetrabromophthalic acid or dibromoneopentyl glycol. Antimony trioxide is frequently used as synergist.

In JP-A-05245838 (CA 1993: 672700), aluminum hydroxide, red phosphorus and antimony trioxide combined with a brominated resin are used to improve flame retardance. A disadvantage of such bromine- or chlorine-containing resins is that corrosive gases are produced in the case of a fire and can lead to considerable damage to electronic components, for example to relays. A further significant disadvantage is that, under unfavorable conditions, polychlorinated or polybrominated dibenzodioxins and -furans can be produced.

There is therefore an increasing need for halogen-free and flame-retardant unsaturated polyester resins, which can then be converted into flame-retardant end products.

It is known from the prior art that molding compositions made from unsaturated polyester resins can be provided with fillers, such as aluminum hydroxide, the elimination of water from the aluminum hydroxide at higher temperatures achieving a certain flame retardance. At very high degrees of filling of from 150 to 200 parts of aluminum hydroxide per 100 parts of unsaturated polyester resin, it is possible to achieve self-extinguishing and a low smoke density. A disadvantage of such systems is that the entire material has a high density, attempts being made to reduce this by, for example, adding hollow glass beads [Stauffer, G. et al., Kunststoffe 85 (1995) 4].

The Polish Patent application 159350 (CA 1995: 240054) describes laminates having up to 180 parts of magnesium hydroxide per 100 parts of unsaturated polyester resin. Because of the high viscosity of such uncured, unsaturated polyester resins having aluminum hydroxide or magnesium hydroxide as flame retardant, formulations of this type cannot be used in the injection process.

The abovementioned injection process comprises laying glass-fiber reinforcements between 2 rigid halves of a mold and, after closing together the halves of the mold, injecting a cold-curable reaction mixture into the void which is partially filled by the glass-fiber reinforcement. Naturally, a precondition for this is a pumpable and/or free-flowing, unsaturated polyester resin mixture (as reaction mixture).

Reinforcing materials currently used are predominantly glass-fiber mats having binders which are insoluble in styrene. Continuous-strand mats and fabrics of various weights per unit area are also suitable.

In order to reduce the filler content, aluminum hydroxide may be combined with ammonium polyphosphate, as described in DE-A-37 28 629.

JP-A-57016017 (CA 96 (22): 182248) describes the use of red phosphorus as flame retardant for unsaturated polyester resins.

JP-A-55094918 (CA 93 (24): 22152T) describes a combination of aluminum hydroxide, red phosphorus and antimony trioxide as flame retardant for unsaturated polyester resins.

According to PL-A-161333 (CA 1994: 632278), a low smoke density and decomposition products of low toxicity are obtained by using aluminum hydroxide, magnesium hydroxide or basic magnesium carbonate, red phosphorus and, if desired, highly-dispersed silica.

Finally, DE-A-21 59 757 describes the use of melamine and aluminum hydroxide as flame retardants in unsaturated polyester resins.

All of the abovementioned unsaturated polyester resins and the processes described for their preparation, however, have the considerable disadvantage that they contain a very high proportion of filler and therefore cannot be shaped to give the desired products by using the injection process which is widespread in industry. For all of the hitherto known combinations of aluminum hydroxide with other flame retardants or flame-retardant systems, the use of this process is impossible or is possible only with difficulty.

It is therefore an object of the present invention to provide halogen-free and flame-retardant, unsaturated polyester resins which when further processed to give end products fulfill the fire-protection standards which apply in various sectors, even at a low filler content. The flame-retardant, unsaturated polyester resins should moreover be capable of further processing by the injection process.

The abovementioned object was achieved by means of unsaturated polyester resins of the type described at the outset, wherein these contain, as flame retardants, a combination of aluminum hydroxide, at least one nitrogen. component and red phosphorus.

From 10 to 100 parts by weight of aluminum hydroxide are preferably present per 100 parts by weight of unsaturated polyester resins.

From 1 to 20 parts by weight of the nitrogen component are preferably present per 100 parts by weight of unsaturated polyester resins.

The nitrogen component is preferably melamine or melamine derivatives of cyanuric acid or of isocyanuric acid, melamine salts, dicyandiamide, guanidine compounds or condensation products of ethyleneurea with formaldehyde.

The flame-retardant, unsaturated polyester resins preferably contain from 1 to 25 parts by weight of red phosphorus per 100 parts by weight of unsaturated polyester resins.

The red phosphorus preferably contains from 0.1 to 5% by weight of an antioxidant and from 0.5 to 20% by weight of a water-insoluble synthetic resin which may, if desired, have been cured and which encapsulates the individual particles of the red phosphorus.

The unsaturated polyester resin preferably contains from 40 to 75 parts by weight of aluminum hydroxide, from 1 to 10 parts by weight of red phosphorus, and from 1 to 5 parts by weight of melamine or melamine cyanurate per 100 parts by weight of unsaturated polyester resins.

The present object is likewise achieved by means of a process for preparing halogen-free and flame-retardant unsaturated polyester resins, which comprises mixing unsaturated polyester resins with a flame retardant in the form of a combination of aluminum hydroxide, at least one nitrogen component and red phosphorus.

It is preferable to mix from 10 to 100 parts by weight of aluminum hydroxide, from 1 to 25 parts by weight of red phosphorus and from 1 to 10 parts by weight of melamine or melamine cyanurate as combination with 100 parts by weight of unsaturated polyester resins.

It is particularly preferable to mix from 40 to 75 parts by weight of aluminum hydroxide, from 1 to 10 parts by weight of red phosphorus and from 1 to 5 parts by weight of melamine or melamine cyanurate as combination with 100 parts by weight of unsaturated polyester resins.

The abovementioned object is likewise achieved by means of shaped articles, laminates or coatings containing the unsaturated polyester resins according to the invention or prepared according to the invention.

These shaped articles, laminates or coatings are preferably reinforced by glass fibers.

Unsaturated polyester resins are polycondensation products made from saturated and unsaturated dicarboxylic acids or their anhydrides with diols. The unsaturated polyester resins are cured by free-radical polymerization using initiators, such as peroxides for example, and accelerators. The double bonds in the polyester chain here react with the double bond of the copolymerizable solvent monomer.

The most important dicarboxylic acids are maleic anhydride, fumaric acid and terephthalic acid. 1,2-Propanediol is most frequently used as diol. Besides this, ethylene glycol, diethylene glycol and neopentyl glycol may also be used. The crosslinking monomer is usually styrene, which is freely miscible with the unsaturated polyester resins and easily copolymerizes, the styrene content of the unsaturated polyester resins being usually from 25 to 40% by weight.

The flame-retardant shaped articles, which are later subjected to appropriate tests, are produced, for example, by mixing an unsaturated polyester resin with a flame-retardant system made from aluminum hydroxide, at least one nitrogen component and red phosphorus, and pressing (cold/wet) the resultant mixture at pressures of from 3 to 10 bar and at temperatures of from 20 to 60° C. It is also possible to press (hot/wet) the resultant mixture at pressures of from 3 to 10 bar and at temperatures of from 80 to 150° C. It is furthermore possible to produce prepregs from the resultant mixture at pressures of from 50 to 150 bar and at temperatures of from 150 to 160° C.

The following compounds were used in the examples:

®Alpolit UP 002 BMT (Vianova Resins GmbH, Wiesbaden, Germany), unsaturated polyester resin, about 60% strength by weight in styrene, acid number max. 30 mg KOH/g, low viscosity (viscosity 300±50 mPa·s).

®Martinal ON 921 (Martinswerk GmbH, Bergheim, Germany), low-viscosity-increase aluminum hydroxide; the particle size is >60%<45 µm.

®Hostaflam RP 654 (Hoechst AG, Frankfurt/Main, Germany), microencapsulated, stabilized red phosphorus in the form of a 50% strength by weight dispersion in a styrene-free, unsaturated polyester resin. The density of the dispersion at 20° C. is 1.45 g/cm$^3$ and the viscosity at 25° C. and 50 rpm is about 25 Pa·s.

®Plastisan B (3V Sigma, Bergamo, Italy), melamine cyanurate, particle size min. 95%<10 µm.

Cobalt accelerator NL 49P (Akzo Chemie GmbH, Düren, Germany), cobalt octoate solution in dibutyl phthalate having a cobalt content of 1% by weight.

Butanox M 50 (Akzo Chemie GmbH, Düren, Germany), methyl ethyl ketone peroxide phlegmatized with dimethyl phthalate, clear liquid having an active oxygen content of min. 9% by weight.

Preparation of the unsaturated polyester resins and of the test specimens

The unsaturated polyester resin, the flame retardants and the cobalt accelerator are mixed homogeneously using a high-speed-stirrer. After adding the peroxide initiator (Butanox M50), the mixture is homogenized again. A layer of continuous-strand glass-fiber mat of 450 g/m$^2$ weight per unit area on a ®Hostaphan release film and a steel frame is placed in a heated press.

The mixture of unsaturated polyester resin and flame retardant is then uniformly distributed and the resultant laminate is covered with a release film. A pressed sheet of 1.4 mm thickness is produced at a temperature of 50° C. during one hour at a pressure of 10 bar.

The fire performance testing was carried out in accordance with the requirements of Underwriters Laboratories "Test for Flammability of Plastics Materials-UL 94", version dated May 2, 1975, on test specimens of length 127 mm, width 12.7 mm and of varying thickness.

The oxygen index was determined in a modified apparatus in a test based on ASTD D 2863-74.

Table 1 shows comparative examples with the sole use in each case of aluminum hydroxide, melamine cyanurate or red phosphorus as flame retardant. It can be seen from the table that the sole use of aluminum hydroxide at a concentration of up to 175 parts per 100 parts of unsaturated polyester resin cannot achieve V-0 grading. The sole use of melamine cyanurate also cannot achieve a V-0 grading as a concentration of up to 75 parts per 100 parts of unsaturated polyester resin.

Red phosphorus was tested at a concentration of up to 15 parts per 100 parts of unsaturated polyester resin no V-0 grading could be achieved. Higher red phosphorus contents are not considered to be useful because of the combustibility of red phosphorus (It should be noted in this connection that ®Hostaflam RP 654 is a 50% strength by weight dispersion and the figures given in the tables should thus be halved for the concentration of red phosphorus).

TABLE 1

(comparative examples): UL 94 fire performance of laminates made from unsaturated polyester resins (30% by weight of continuous-strand glass-fibre matt, thickness of laminate 1.5 mm)

| Example No. | Parts of flame retardants/100 parts of unsaturated polyester resin | After-flame time [s] after 1st flame application | After flame time [s] after 2nd flame application | UL 94 classification | LOI |
|---|---|---|---|---|---|
| 1 | 125 ATH* | 12 | completely consumed | n.c.*** | 0.3 |
| 2 | 150 ATH | 8 | 35 | n.c. | 0.33 |
| 3 | 175 ATH | 5 | 15 | V-1 | 0.37 |
| 4 | 5 P$_{red}$ (RP 654) | completely consumed | — | n.c. | 0.23 |
| 5 | 10 P$_{red}$ (RP 654) | completely consumed | — | n.c. | 0.25 |
| 6 | 15 P$_{red}$ | 15 | com- | n.c. | 0.27 |

TABLE 1-continued (comparative examples): UL 94 fire performance of
laminates made from unsaturated polyester resins (30% by
weight of continuous-strand glass-fibre matt, thickness
of laminate 1.5 mm)

| Example No. | Parts of flame retardants/100 parts of unsaturated polyester resin | After-flame time [s] after 1st flame application | After flame time [s] after 2nd flame application | UL 94 classification | LOI |
|---|---|---|---|---|---|
|   | (RP 654) |   | pletely consumed |   |   |
| 7 | 25 MC** (Plastisan B) | completely consumed | — | n.c. | 0.21 |
| 8 | 50 MC (Plastisan B) | 20 | completely consumed | n.c. | 0.24 |
| 9 | 75 MC (Plastisan B) | 10 | 35 | n.c. | 0.27 |

*ATH = Alumina trihydrate
**M.C. = melamine cyanurate
***n.c. = not classified

Table 2 shows the fire test results of unsaturated polyester resin laminates having red phosphorus and alumina trihydrate as flame retardants. Even using this combination at up to a total flame retardants content of 105 parts per 100 parts of unsaturated polyester resin, it was impossible to achieve a V-0 classification.

TABLE 2

(comparative examples): Fire performance of laminates made from unsaturated polyester resins (30% by
weight of continuous-strand glass-fibre matt, thickness of laminate 1.5 mm)
Flame retardants: red phosphorus and alumina trihydrate

| Example No. | Parts of flame retardants/100 parts of unsaturated polyester resin | After-flame time [s] after 1st flame application | After flame time [s] after 2nd flame application | UL 94 classification | LOI |
|---|---|---|---|---|---|
| 10 | 50 ATH* 5 $P_{red}$(RP 654) | 10 | completely consumed | n.c. | 0.27 |
| 11 | 50 ATH 10 $P_{red}$(RP 654) | 5 | 25 | V-1 | 0.29 |
| 12 | 100 ATH 5 $P_{red}$(RP 654) | 5 | 15 | V-1 | 0.31 |
| 13 | 100 ATH 10 $P_{red}$(RP 654) | <1 | <1 | V-0 | 0.33 |

Table 3 shows the combination according to the invention of the three flame retardants alumina trihydrate, melamine cyanurate and red phosphorus. By adding a maximum of 67.5 parts of solid flame retardants per 100 parts of unsaturated polyester resin, here, it is possible to achieve a classification of V-0 at a laminate thickness of 1.5 mm. Because of the low filler content, these unsaturated polyester resin laminates can be produced by the injection process.

In place of melamine cyanurate, it is also possible to use other organic nitrogen compounds, such as melamine, melamine phosphate, guanidine phosphate or dicyandiamide.

TABLE 3

(invention): UL 94 fire performance of laminates made
from unbsaturated polyester resins (30% by
weight of continuous-strand glass-fibre
matt, thickness of laminate 1.5 mm)
Combination of alumina trihydrate,
melamine cyanurate and red phosphorus as
flame retardants

| Example No. | Parts of flame retardants/100 parts of unsaturated polyester resin | After-flame time [s] after 1st flame application | After flame time [s] after 2nd flame application | UL 94 classification | LOI |
|---|---|---|---|---|---|
| 14 | 60 ATH* 12 $P_{red}$(RP 654) 5 melamine cyanurate | <1 | <1 | V-0 | 0.35 |
| 15 | 60 ATH 12 $P_{red}$(RP 654) 2 melamine cyanurate | <1 | <1 | V-0 | 0.32 |
| 16 | 60 ATH 12 $P_{red}$(RP 654) 2.5 melamine cyanurate | <1 | <1 | V-0 | 0.31 |

*ATH = Alumina trihydrate
***M.C. = melamine cynaurate
***n.c. = not classified

Overall it is clear that aluminum hydroxide, red phosphorus and a nitrogen compound (melamine cyanurate), when tested alone, even in relatively high concentrations, have low effectiveness.

Surprisingly, it has now been found that a combination according to the invention of aluminum hydroxide, red phosphorus and a nitrogen compound achieves a classification of V-0 in accordance with the UL 94 classification at a concentration of a maximum of just 71 parts of flame-retardants per 100 parts of unsaturated polyester resin.

What is claimed is:

1. A halogen-free and flame retardant unsaturated polyester resin having a V-0 flame rating according to UL® 94 which contains, as flame retardant, a combination in weight parts per hundred weight parts of said unsaturated polyester resin of 10 to 100 parts by weight of aluminum hydroxide, from 1 to 20 parts by weight of at least one nitrogen component for improving fireproofing and from 1 to 25 parts by weight of red phosphorus wherein said nitrogen component is selected from the group consisting of melamine, melamine salts, dicyandiamide, guanidine compounds and condensation products of ethyleneurea with formaldehyde.

2. A halogen-free and flame-retardant unsaturated polyester resin as claimed in claim 1 wherein the red phosphorus contains from 0.1 to 5% by weight of an antioxidant and from 0.5 to 20% by weight of a water-insoluble synthetic resin which may, if desired, have been cured and which encapsulates the individual particles of the red phosphorus.

3. A halogen-free and flame-retardant unsaturated polyester resin as claimed in claim 1 which contains from 40 to 75 parts by weight of aluminum hydroxide, from 1 to 10 parts by weight of red phosphorus, and from 1 to 5 parts by weight of melamine or melamine cyanurate per 100 parts by weight of unsaturated polyester resin.

4. A process for preparing a halogen-free and flame-retardant unsaturated polyester, which comprises mixing 100 weight parts of an unsaturated polyester resin with a flame retardant in the form of a combination of 10 to 100 parts by weight of aluminum hydroxide, from 1 to 20 parts by weight of at least one nitrogen component for improving fireproofing and from 1 to 25 parts by weight of red phosphorus wherein said nitrogen component is selected from the group consisting of melamine, melamine salts, dicyandiamide, guanidine compounds and condensation products of ethyleneurea with formaldehyde.

5. The process as claimed in claim 4, wherein from 40 to 75 parts by weight of aluminum hydroxide, from 1 to 10 parts by weight of red phosphorus and from 1 to 5 parts by weight of melamine or melamine cyanurate are mixed as combination with 100 parts by weight of unsaturated polyester resin.

6. A shaped article, laminate or coating made from an unsaturated polyester resin as claimed in claim 1 or prepared using the unsaturated polyester resin by the process of claim 4.

7. A shaped article, laminate or coating as claimed in claim 6, which is reinforced by glass fibers.

8. A shaped article, laminate or coating made from an unsaturated polyester resin as claimed in claim 2 or prepared using the unsaturated polyester resin made by the process of claim 10.

\* \* \* \* \*